United States Patent [19]
Muller et al.

[11] Patent Number: 5,886,781
[45] Date of Patent: Mar. 23, 1999

[54] DEVICE FOR THE GEOMETRIC INSPECTION OF VEHICLES

[75] Inventors: Patrice Muller, Chartres; Paul Coetsier, Pomponne, both of France

[73] Assignee: Muller BEM, Chartres Cedex, France

[21] Appl. No.: 851,662

[22] Filed: May 6, 1997

[30] Foreign Application Priority Data

Jun. 5, 1996 [FR] France ................................... 96 05609

[51] Int. Cl.[6] .................................................. G01B 11/26
[52] U.S. Cl. ........................................................ 356/139.09
[58] Field of Search ................ 359/139.09, 140

[56] References Cited

U.S. PATENT DOCUMENTS

| | | | |
|---|---|---|---|
| 5,488,471 | 1/1996 | McClenahan et al. | 356/139.09 |
| 5,636,016 | 6/1997 | Coetsier et al. | 356/139.09 |
| 5,724,128 | 3/1998 | January | 356/139.09 |
| 5,731,870 | 3/1998 | Bartko et al. | 356/139.09 |

FOREIGN PATENT DOCUMENTS

| | | |
|---|---|---|
| 0 647 829 | 4/1995 | European Pat. Off. . |
| 2192288 | 2/1974 | France . |
| 2368017 | 5/1978 | France . |
| 2406186 | 5/1979 | France . |
| WO 88/04765 | 6/1988 | WIPO . |

*Primary Examiner*—Mark Hellner
*Attorney, Agent, or Firm*—Young & Thompson

[57] ABSTRACT

A device for inspecting the geometry of a vehicle, in which the appearance of an element fixed to a wheel rim of the vehicle is caused to vary as a function of the angle of view at which it is seen, without thereby producing a perspective image of this element. The variation of appearance is caused by moire gratings. The device is useful for the geometric inspection of wheeled vehicles.

10 Claims, 8 Drawing Sheets

FIG. 12

DEVICE FOR THE GEOMETRIC INSPECTION OF VEHICLES

CROSS REFERENCE TO RELATED APPLICATION

This application corresponds to French application No. 96 05609, filed May. 6, 1996, the disclosure of which is incorporated herein by reference.

FIELD OF THE INVENTION

The invention relates to a device for the geometric inspection of vehicles, of the type comprising at least one element adapted to be secured to a wheel rim of a vehicle by means of a securement gripper or the like.

BACKGROUND OF THE INVENTION

There are known numerous devices for the geometric inspection of vehicles, in which a measuring head provided with suitable detectors is secured to a wheel rim of the vehicle and transmits by wire connection or wireless connection signals representative of physical parameters, to a programmable central unit, adapted to compute the geometry of the vehicle.

However, these known measuring heads comprise detectors that are fragile and electronic members sensitive to shocks, giving rise to risk of damage during operations of geometric inspection, particularly during securement on the wheel rim or during mounting of the wheel rim.

To overcome this drawback, it has been provided to secure targets or mirrors on the wheel rims of vehicles, so as to illuminate these targets or these mirrors and to observe the reflected image by means of a camera or like observation member. A portable apparatus for measuring axes by laser of this type is described in the document "KRAFTHAND", volume 9, May 5, 1979, page 608. Another apparatus of this type is described in WO 94/05969.

These apparatus with fixed target or mirror on wheel rims have the drawback of requiring a device for image analysis and a relatively complicated computation to determine the angle of sight relative to the image in perspective or in reflection observed with the image in real size of each target or of each member. Moreover, because of the distance from the observation bench to the targets or mirrors, the selectivity of measurement is low, which requires the use of detectors of high precision or matrix observation cameras with high resolution.

SUMMARY OF THE INVENTION

The invention has for its object overcoming the drawbacks of the known art, by providing a new device of high selectivity permitting the use of cameras of known type, particularly linear CCD cameras, and avoiding the risk of damage to the electronic measurement heads of the prior art.

The invention has for its object a device for the geometric inspection of vehicles, of the type comprising at least one element adapted to be secured to a wheel rim of a vehicle by means of a securement gripper or the like, characterized in that the device comprises means adapted to cause to vary the appearance of the element as a function of angle of sight at which it is seen, without making a perspective image of this element.

According to other characteristics:

said appearance variation means are independent of the distance separating the point of sight from the device;

said means comprise at least one pair of moiré gratings spaced from each other;

at least one moiré grating nearest the point of sight comprises an indexing means defining a measurement origin;

in one pair of gratings, two spaced moiré gratings are substantially parallel to each other;

in one of pair of gratings, two spaced moiré gratings are disposed on two surfaces forming an angle relative to each other;

in one pair of grating, two spaced moiré gratings each comprise a first grating for fine angular measurement and a second grating for absolute angular measurement;

an element of the device comprises at least two pairs of gratings, which are not parallel to each other;

the device comprises at least one camera or observation means adapted to observe the appearance of each element secured to a vehicle wheel rim and to transmit a signal representative of said observation to a programmable central unit, so as to compute the angles of orientation of said element and thereby to derive the physical parameters representative of the geometry of the vehicle;

BRIEF DESCRIPTION OF THE DRAWINGS.

the device comprises two cameras spaced by a distance greater than the track of the vehicle to be inspected.

A simple means to cause the appearance of an element to vary as a function of the angle of sight at which it is seen, is thus the use of measurement techniques by moiré. There are known numerous techniques for measurement by moiré: projected moiré, dark moiré, superposition moiré and other equivalent interference techniques. However, these measuring techniques of moiré have been used principally until now for the verification of the surface of an object to be tested and its inspection for conformity with respect to a reference surface. Such inspection techniques of the surface are particularly known from FR 2,658,601, FR 2,614,691, FR 2,580,066, and FR 2,520,106. None of these documents indicates nor suggests using a measurement technique by moiré for the geometric inspection of wheeled vehicles.

The invention will be better understood from the description which follows, given by way of non-limiting example, with reference to the accompanying drawings, in which.

DESCRIPTION OF THE PREFERRED EMBODIMENTS.

Figure 1A:
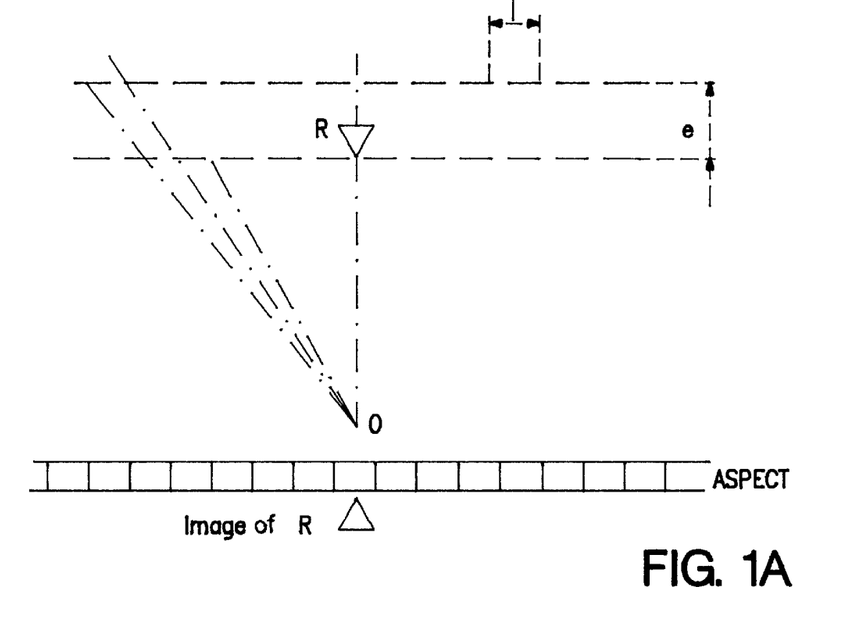
FIGS. 1a and 1b show schematically the measurement principle used in the invention.
Figure 1B:
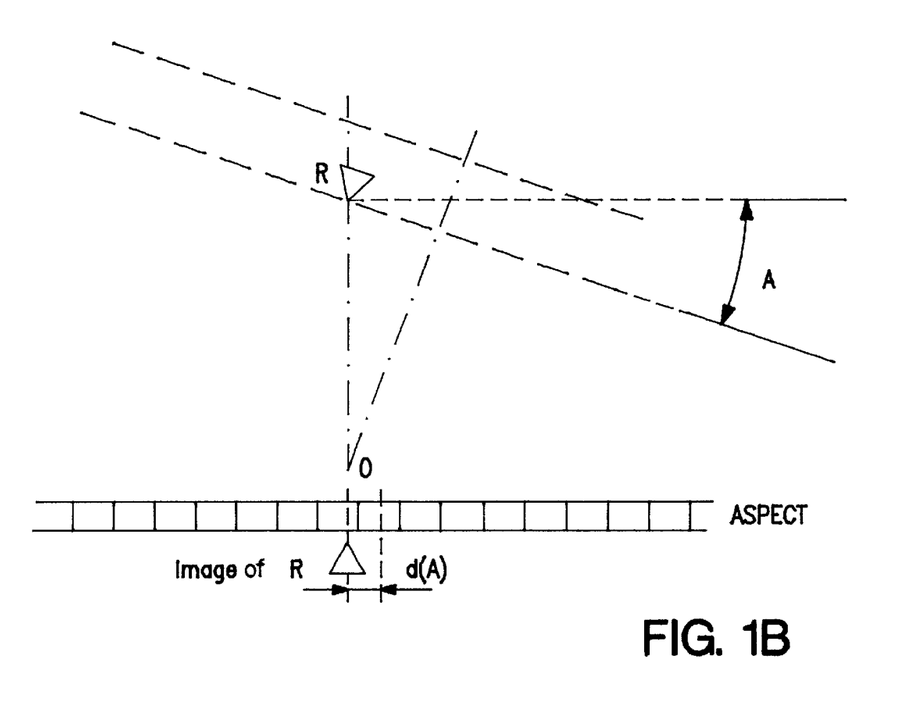

With reference to FIGS. 1a and 1b, two gratings with black lines regularly spaced at an interval corresponding to their widths l are observed from a center of observation O. The gratings formed of lines are separated from each other by a spacing e, such that the observation from the center O causes a central light fringe to appear, substantially symmetrical relative to the reference R forming an index located on the support of the gratings, facing the center of observation O, and lateral fringes alternately dark and light, symmetrical relative to this central fringe.

When the pair of gratings is turned an angle A, the observer disposed at the center of observation O has the sensation of a movement of the central light fringe relative to the image of the reference R forming an index, by a distance corresponding to an offset d (A) which is a trigonometric function of the angular displacement A.

This moiré technique accordingly permits connecting the angular inclination A to a displacement of the central light (or dark) fringe.

Figure 2A:
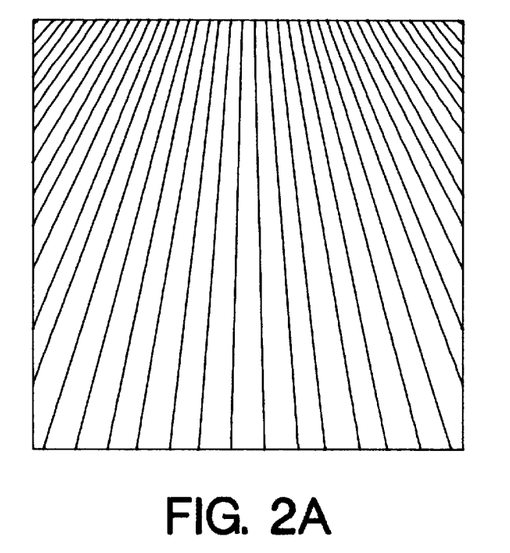
FIGS. 2a and 2b show schematically an explanatory arrangement of a pair of moiré gratings spaced from each other for practicing the invention.
Figure 2B:
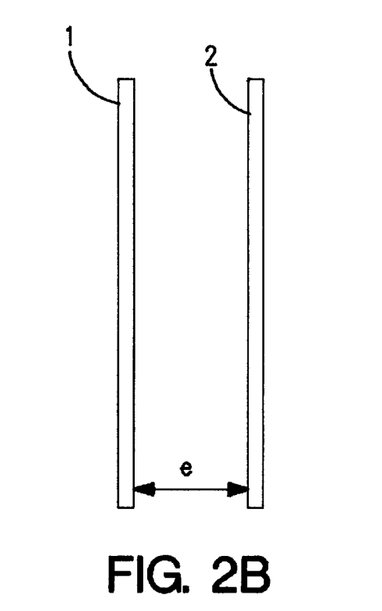

With reference to FIGS. 2a and 2b, two gratings 1 and 2 seen in cross-section are substantially parallel to each other and are superposed to permit a moiré observation. The gratings 1 and 2 are preferably identical and comprise. substantially trapezoidal lines, with a progressive interval. The gratings are preferably formed of square or rectangular panels of dimensions predetermined for the sought angular resolution.

Figure 3A:
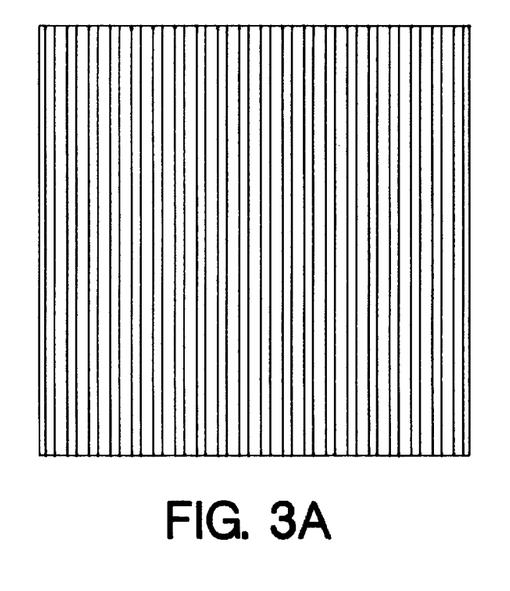
FIGS. 3a 3b show schematically another explanatory arrangement of another pair of moiré gratings spaced from each other for practicing the invention.
Figure 3B:
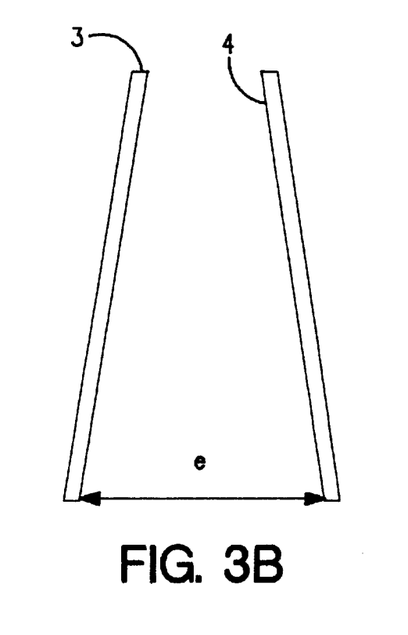

With reference to FIGS. 3a and 3b, two other gratings 3 and 4 are shown and form between them an upwardly converging angle. The gratings 3 and 4 are preferably identical and constituted by lines of constant width, parallel to each other and separated by transparent spaces of a width corresponding to the width of the lines.

Figure 4:
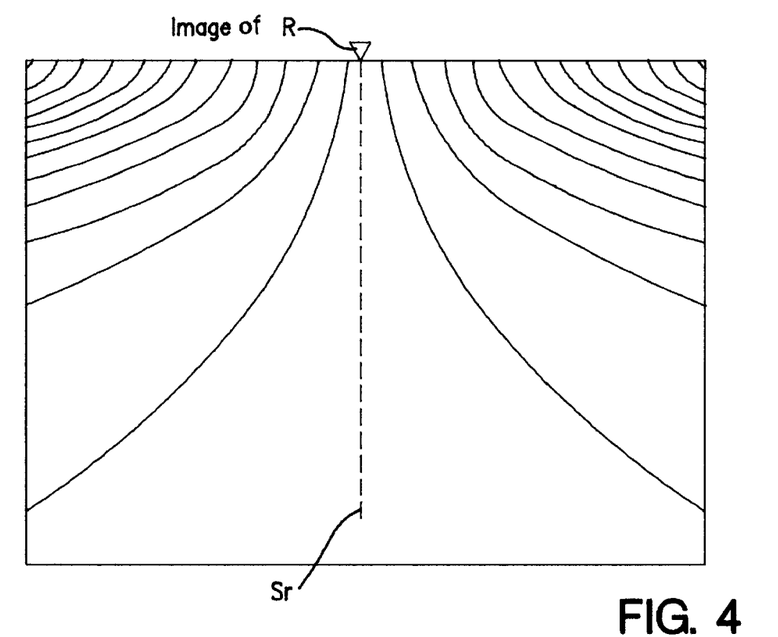
FIG. 4 shows schematically the appearance of a moiré observation corresponding to a normal incidence on an arrangement of two gratings according to FIG. 2 or FIG. 3.

With reference to FIG. 4, a moiré observation perpendicular to a pair of gratings 1 and 2 or perpendicular to the bisecting plane of a pair of gratings 3 and 4, is shown. It will be seen that the shape of the moiré curves obtained is substantially symmetrical to the axis Sr passing through the image of the index reference R corresponding to the reference R forming an index located on the support of the gratings.

When the index R is located on the normal dropped from the center of observation O onto the support of the gratings, the appearance of the moiré observation is symmetrical relative to the axis Sr passing through the image of the reference R observed at the center of observation O.

The interference of the lines of gratings 1 and 2 of FIG. 2b (or gratings 3 and 4 of FIG. 3b) produces an appearance of curved fringes flaring downwardly, alternately dark and light.

The angular spacing of two adjacent dark (or light) fringes located on the same side of the reference R is a trigonometric function f of the widths of the line, of the spacing of the line gratings and of the ordinal number of the fringe in question.

Figure 5:
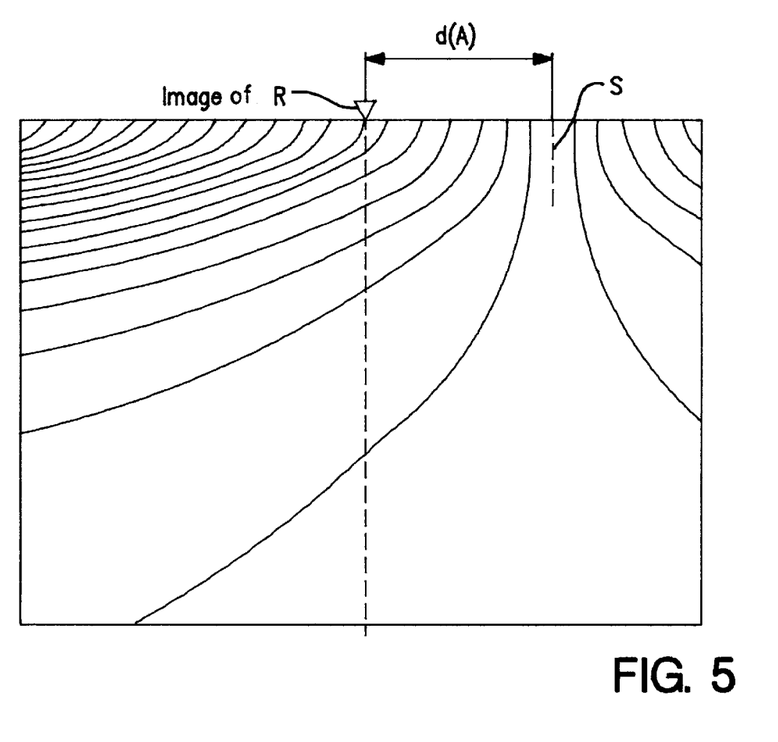
FIG. 5 shows schematically the appearance of moiré observation at angular incidence of an arrangement of two moiré gratings according to FIG. 2 or FIG. 3.

With reference to FIG. 5, when the pair of gratings is turned at angle A similar to the angle A of FIG. 1, the moiré observation causes to appear a displacement of the fringes by an offset d (A) which is a trigonometric function of the angle of inclination A.

Moreover, counting the number of fringes corresponding to the offset d (A) is facilitated by taking the number of fringes following the straight line of intersection Sr passing through the image of reference index R. Thus, for example, the number of fringes from the first moiré line is three in the case of FIG. 5.

Thus, in the case in which the central fringe of the axis of symmetry S leaves the support of the gratings as the result of substantial rotation, it suffices to count the number of fringes cut by the straight line Sr passing through the image of reference index R thereby to determine the angular position of the support of the gratings by means of the following formula:

$$A = a + \sum_{i=1}^{n} f(i),$$

in which A is the angle of rotation of the support, a is the elemental angle of rotation from the fringe nearest the reference image R, i is the number of the fringe and f(i) is the mentioned trigonometric function associated with fringe number i.

An important advantage of the invention is the following: given that the observations are independent of the distance separating the observation point of the pair of gratings observed, the angular field remain constant such that the appearance of a support panel for gratings is invariable when its spacing from the center of observation increases.

As a result, the precision of angular measurement of the device is independent of the distance of the support panels for the gratings to the center of observation.

The invention thus overcomes the drawbacks of the prior art, in which the reflected image or the perspective image of a target decreases with distance and in which the precision of angular measurement decreases as a result, very greatly with distance.

The size and spacing of the lines is defined as a function of the desired angular precision and of the number of visible fringes. To this end, it is preferred to use two pairs of moiré gratings of which the first is a pair of gratings of the type shown in FIG. 1, the so-called uniform moiré, to effect a fine angular measurement, and of which the second is pair of gratings of the type of FIGS. 2 and 3, so-called progressive moiré, to effect an absolute angular measurement to determine the number of fringes seen on the uniform moiré. By way of example, the fine measurement corresponds to an angular precision of 30 seconds of arc, whilst the absolute angular measurement relative to a reference index corresponds to an absolute precision of 30 minutes of arc.

Figure 6:
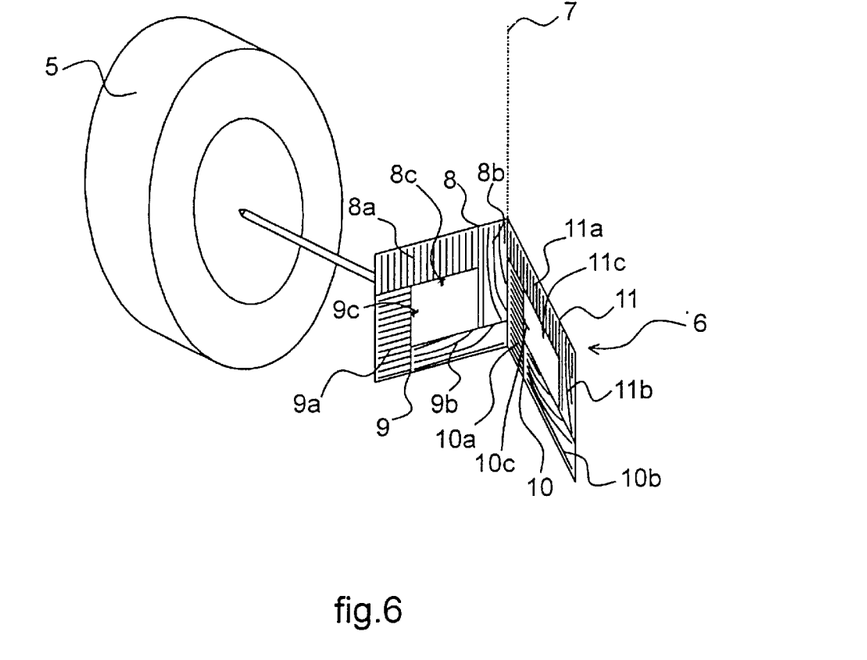
FIG. 6 shows schematically a first embodiment of a device according to the invention secured to a vehicle wheel.

With reference to FIG. 6, there is mounted on a wheel 5 of a vehicle an element 6 of a device in the form of a dihedral or open book whose axis 7 is substantially vertical. This element 6 carries four pairs 8 to 11 of gratings, of which each pair comprises a pair of gratings 8a–11a of uniform moiré for precision and a pair of moiré gratings 8b–11b which are progressive for absolute measurement. The reference indexes 8c–11c are designated by arrows forming a contrast of luminous intensity and can be embodied as luminescent diodes, or alternatively as interruptions of a pair of gratings letting appear a black or white space of unvarying appearance, or again in the form of a recess provided through the pairs 8–11 of gratings. The pairs 8–11 of gratings are provided for example on opposite sides of a glass plate by mechanical or chemical engraving or by deposit of ink or by gluing of wires, or other means of providing black lines.

Figure 7:
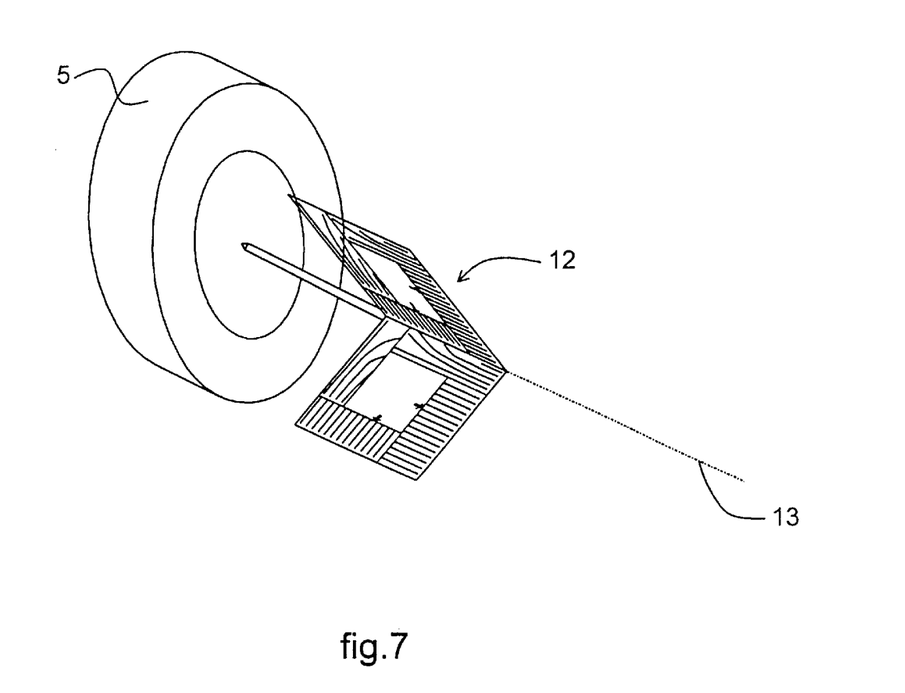
FIG. 7 shows schematically a second embodiment according to the invention fixed to a vehicle wheel.

With reference to FIG. 7, another embodiment of an element 12 of a device according to the invention is in the form of a dihedral or open book whose axis 13 is substantially horizontal. This element is substantially similar to the element of FIG. 6 on which is carried out a rotation of 90° in a vertical plane and a translation to cause the axis of the dihedral to coincide with the axis of the wheel.

Figure 8:
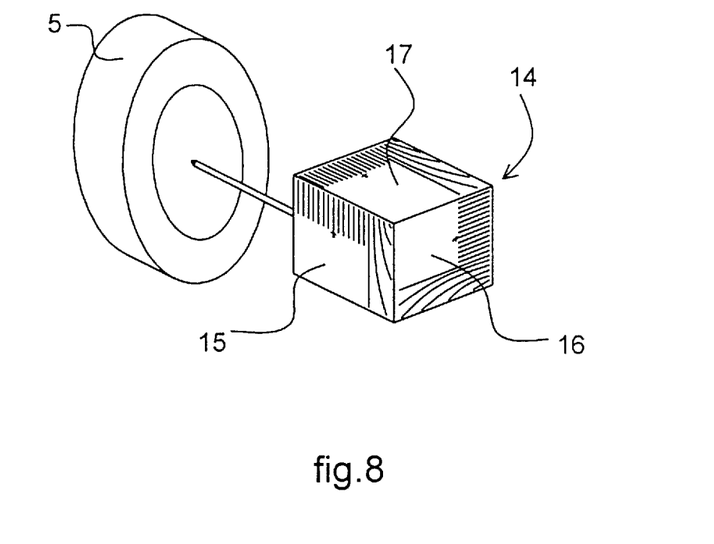
FIG. 8 shows schematically a third embodiment fixed to the wheel rim of a vehicle.

With reference to FIG. 8, another embodiment of element 14 of a device according the invention is in the form of a cube comprising three observable faces: two vertical faces 15 and 16 each carrying a pair of gratings, and a horizontal face 17 located on the upper side.

Figure 9:
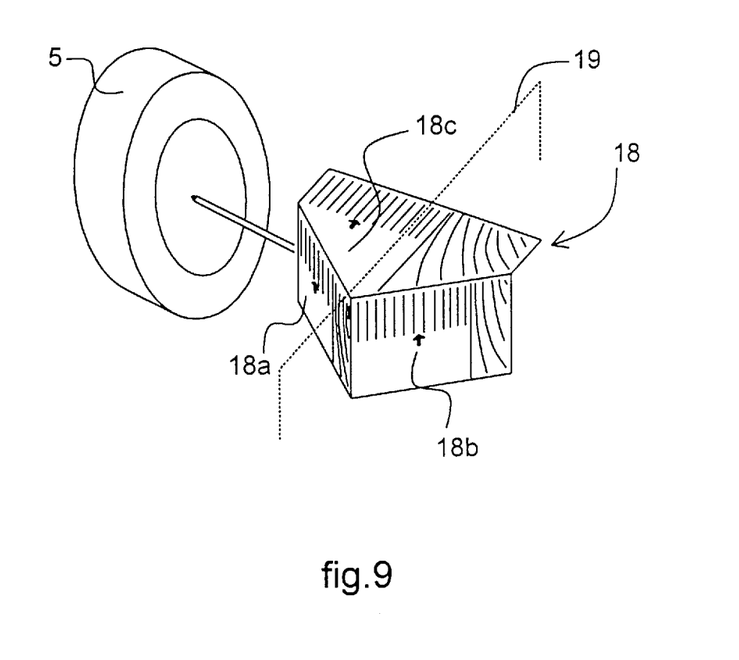
FIG. 9 shows schematically a fourth embodiment of a device according to the invention fixed to the wheel rim of a vehicle.

With reference to FIG. 9, another embodiment of element 18 of a device according to the invention is in the form of a projecting dihedral in the form a trihedron formed by three planes 18a–18c forming for example at an angle of 120° two by two and oriented such that the bisecting plane 19 of the two planes 18a, 18b will be parallel to the plane of the wheel 5.

The embodiments of FIGS. 6–9 are particularly advantageous for measuring the steering of driving wheels of a vehicle thereby avoiding the use of rotatable plates for measuring steering.

Figure 10:
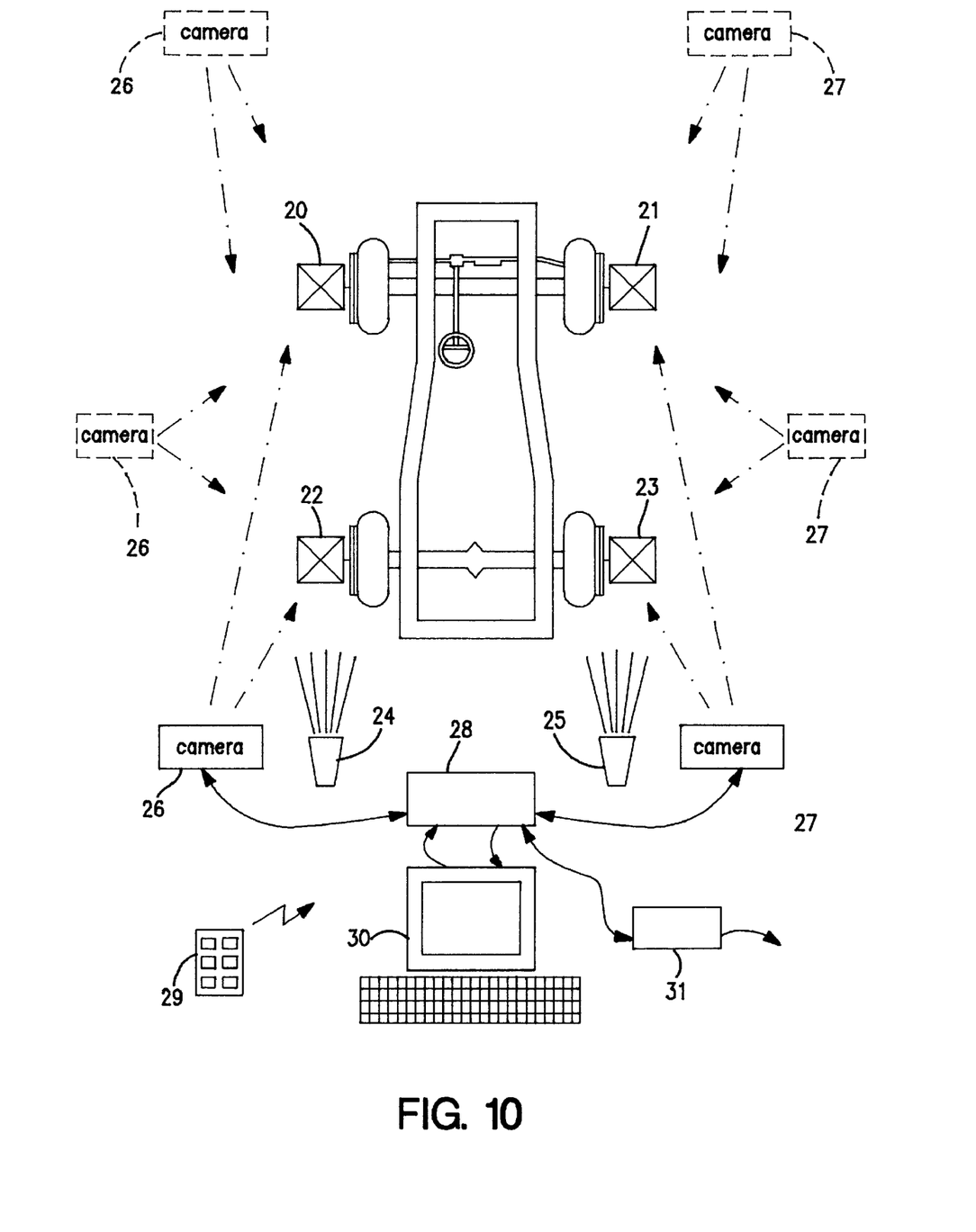
FIG. 10 shows schematically a view from above of a device according to the invention.

With reference to FIG. 10, a general arrangement of a device according to the invention is shown with four elements 20–23 of devices secured to the four wheels of the vehicle to be inspected and illuminated by light projectors 24 and 25. The elements 20–23 of the device secured to the wheels of the vehicle are observed by a pair of cameras 26, 27 each constituted for example by a linear CCD camera and by an oscillating mirror mounted on a galvanometer or other means for driving in rotation to cover all the useful field of observation. The cameras 26 and 27 are connected to a programmable central unit 28 permitting the visualization on a screen 30 and connected on the one hand to a telecontrol 29 for movable display permitting repeating the indications of the screen 30 and on the other hand to an external network 31 permitting the direct connection to a vehicle database or to a CD ROM integrated in the programmable central unit 28.

As will be seen, the linear CCD cameras, for example of the type described in FR 2,711,238, can be disposed pairwise on the side of the rear wheels of the vehicle, or alternatively between the front and rear wheels, or else to the side of the front wheels of the vehicle to be inspected.

Figure 11:
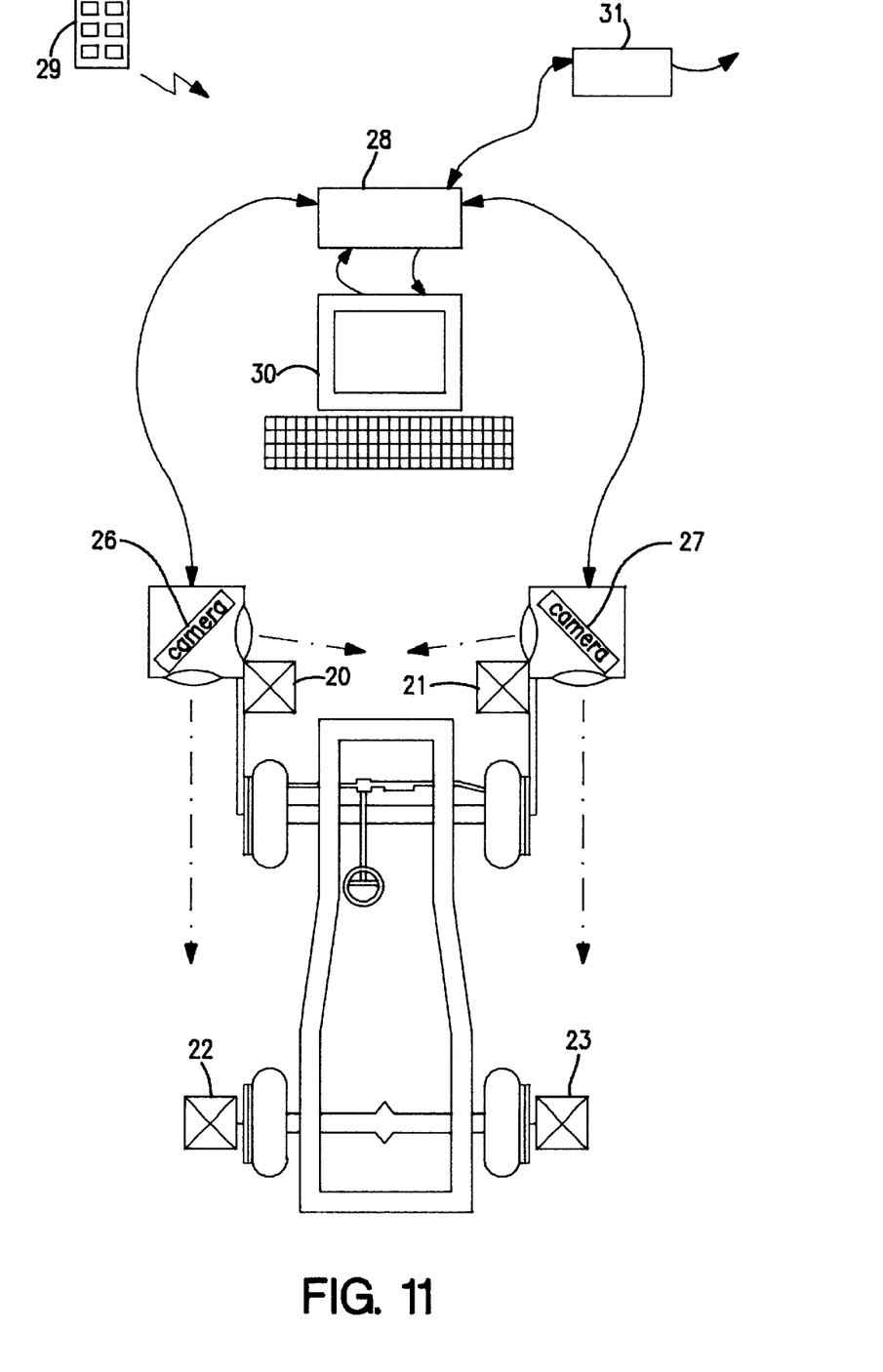
FIG. 11 shows schematically a view from above of another device according to the invention.

With reference to FIG. 11 another arrangement of the device is shown with four elements 20–23 of devices, among which a pair 20, 21 of elements of the device is adapted for transverse measurements relative to the front axle, a third element 22 is adapted for measurements on the left longitudinal side and a fourth element 23 is adapted for measurements on the right longitudinal side.

In this embodiment, the cameras 26 and 27 mounted on the front driving axle each have a longitudinal field of observation, in the direction of elements 22 and 23 respectively, and a transverse field of observation, in the direction of elements 20 and 21, respectively.

The cameras 26 and 27 are preferably linear CCD cameras with oscillating mirror; the invention also covers any other modified embodiment, in which the measurements in the transverse direction are taken with the aid of transverse observation slots (technique of the apparatus 8675 produced by the assignee of the present applicant) or with the aid of potentiometric detectors (technique of the apparatus 8670 produced by the assignee of the present applicant).

Inclinometers may be provided to determine the parameters necessary for changes of coordinates, so as to express the measurements in an absolute reference (a reference defined by two vertical planes and a horizontal plane).

The invention also covers the modification (not shown) in which the cameras 26 and 27 are mounted secured to the rear axle, on the axle or in front of or behind the rear wheels. In this case, the transverse measurements are taken relative to the rear axle.

The reference characters identical to the characters of FIG. 10 show identical elements or functional equivalents to the elements of FIG. 10 which have been described with reference to this figure.

Figure 12:
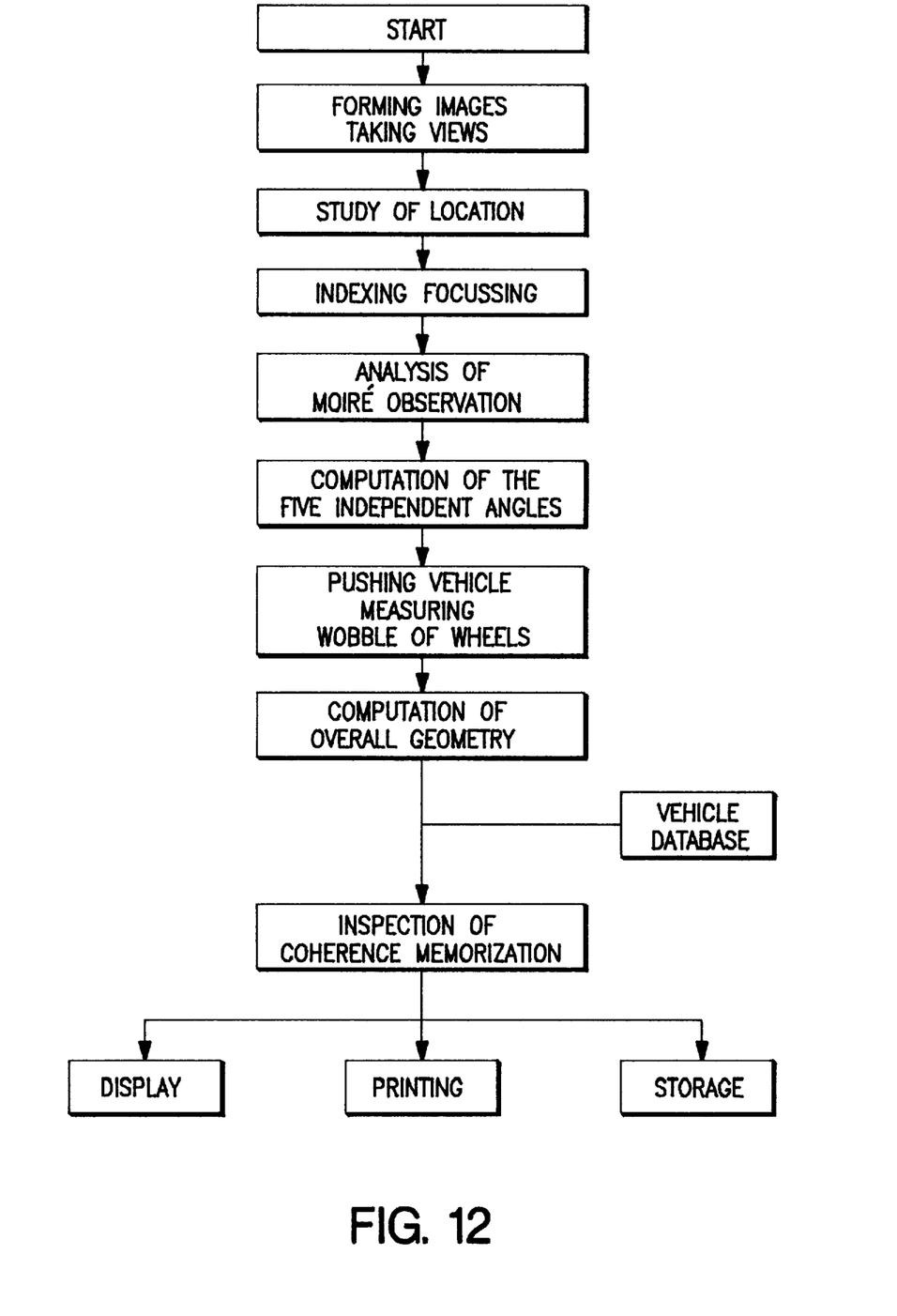
FIG. 12 shows schematically an organigram of operation of a device according to the invention.

Referring to FIG. 12, a program of operation of the device according to the invention comprises the following steps: a start during which the conditions of illumination are established by turning on projectors 24, 25 if necessary; a step of taking images and views permitting verifying the general operation of the system; a step of studying and localization of the elements 20 to 23 secured to the wheels of the vehicle; a step of studying the indexing reference R of each element 20–23 and focussing on the indexing reference; a step of analysis of the observation of the moirépermitting determining the values of offset which are trigonometric functions of angular inclination according to a desired geometrical axis; a step of computing the independent angles permitting defining the position of each element 20 to 23 on each wheel of the vehicle; a step of pushing the vehicle to measure the wobble of each wheel and to memorize the parameters of measurement correction; a step of computing the overall geometry of the vehicle; a step of inspecting for coherence and memorizing the inspection of the geometry carried out in connection with a database of accessible vehicles by means of a telephonic network or a wireless network or to be found in a permanent memory contained in the programmable central unit of the device.

The results of geometric inspection of the vehicle are displayed on a screen, printed or if desired stored.

The invention described with reference to particular embodiments is in no way thereby limited, but covers all variations of form and moiré technique and all variations of embodiment in which the device comprises means adapted to cause to vary the appearance of the element fixed to a wheel of the vehicle as a function of the angle of sight under which it is seen.

Thus, the invention also covers modifications according to which a moiré grating is projected on a grating of an element fixed to a wheel of the vehicle; or another modification in which the two grating are projected on a panel with a uniform background fixed on the vehicle, said panel not being necessarily flat.

What is claimed is:

1. An apparatus for the geometric inspection of a vehicle, comprising at least one element (20–23) adapted to be secured to a rim of a wheel (5) of the vehicle by means of a securement gripper, and imaging means for taking an image of said at least one element, wherein each said at least one element comprises means (1–4, 8–11, 15–17, 18a–18c) the appearance of the element (20–23) to vary as a function of the angle of view under which the element (20–23) is seen, without constituting a perspective image of this element (20–23).

2. The apparatus according to claim 1, wherein said means (2–4, 8–11, 15–17, 18a–18c) for causing the appearance of the element to vary are independent of the distance separating the point of view from the apparatus.

3. The apparatus according to claim 1, wherein said means for causing the appearance of the element to vary (1–4, 8–11, 15–17, 18a–18c) comprise at least one pair (8–11) of moiré gratings (1,2; 3,4) spaced from each other.

4. The apparatus according to claim 3, wherein at least one said moiré grating (1–4) the nearest to the point of view (O) comprises a reference mean defining a measurement origin.

5. The apparatus according to claim 3, wherein a pair of spaced moiré gratings (1,2) are substantially parallel to each other.

6. The apparatus according to claim 3, wherein two moiré gratings (3, 4) spaced from each other are disposed on two surfaces forming an angle with each other.

7. The apparatus according to claim 3, wherein a pair of two spaced moiré gratings (8–11) each comprise a first grating (8a, 9a, 10a, 11a) for a fine angular measurement, and a second grating (8b, 9b, 10b, 11b) for absolute angular measurement.

8. The apparatus according to claim 3, wherein an element comprises at least two pairs (8–11) of gratings which are not parallel to each other.

9. The apparatus according to claim 1, wherein the imaging means comprise at least one camera (26, 27) adapted to observe the appearance of each element (20–23) secured to a wheel rim of the vehicle and to transmit a signal representative of said observation to a programmable central Processing unit (28) so as to compute the angles of orientation of said element (20–23) and to derive physical parameters therefrom which are representative of the geometry of the vehicle.

10. The apparatus according to claim 9, wherein the imaging means comprise two cameras (26, 27) spaced apart a distance greater than the track of the vehicle to be inspected.

* * * * *